United States Patent Office 2,884,377
Patented Apr. 28, 1959

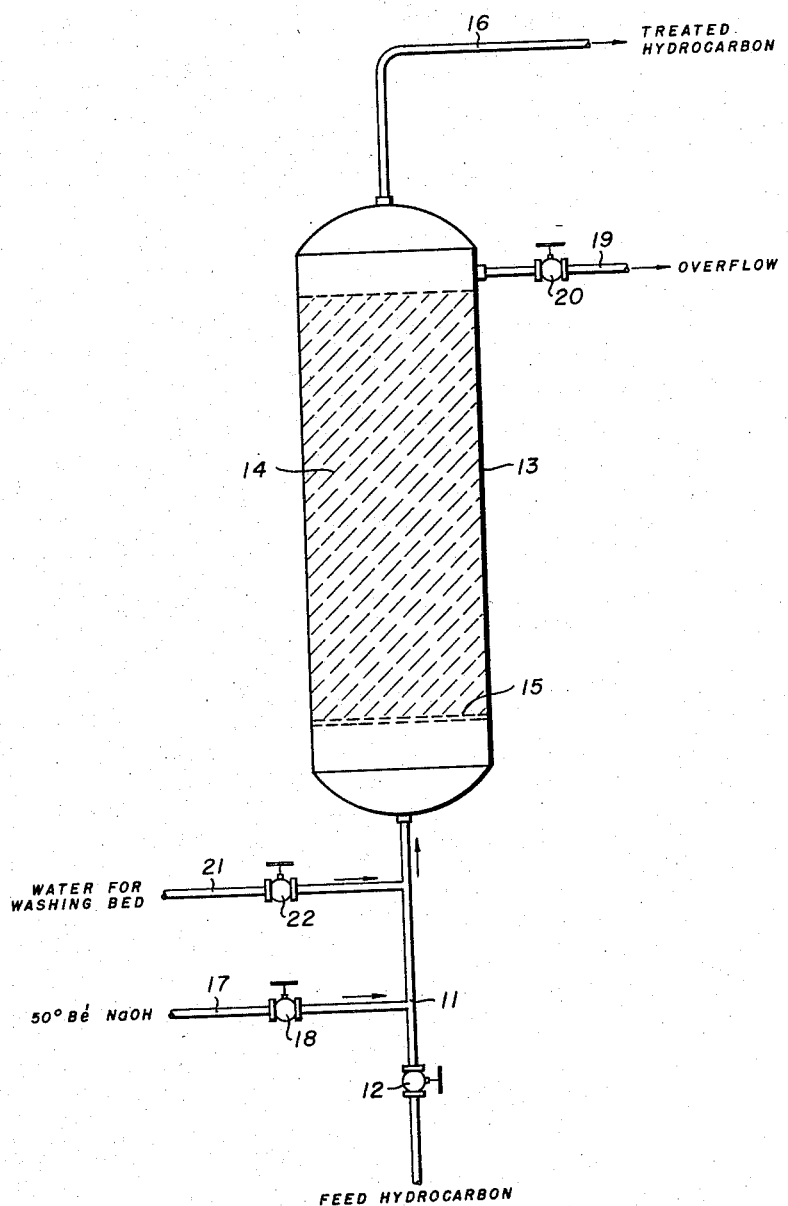

2,884,377

REMOVAL OF HYDROGEN SULFIDE FROM HYDROCARBONS

Samuel Bozich, Baytown, Albert J. Shmidl, Crosby, and Jack W. Smalling, Baytown, Tex., assignors, by mesne assignments, to Esso Research and Engineering Company, Elizabeth, N.J., a corporation of Delaware Application August 21, 1956, Serial No. 605,280

7 Claims. (Cl. 208—230)

The present invention is directed to a method for treating hydrocarbons. More particularly, the invention is directed to a method for removing hydrogen sulfide from hydrocarbons. In its more specific aspects, the invention is concerned with removing substantially all of the hydrogen sulfide from hydrocarbon solvents.

The present invention may be briefly described as a method for treating hydrocarbons in which a feed hydrocarbon containing from about 0.2 to about 5 parts per million of hydrogen sulfide and containing from about 20 to about 100 parts per million of water is contacted with a bed of inert particulate bodies having dispersed thereon a film of approximately 50° Bé. sodium hydroxide. The hydrocarbon contacts the bed under conditions such that the bed removes from the hydrocarbon substantially all of the hydrogen sulfide such that the contacted hydrocarbon contains no more than 0.1 part per million of hydrogen sulfide and such that the amount of water in the contacted hydrocarbon is no more than the amount of water in the feed hydrocarbon.

The feed hydrocarbon in the present invention is suitably a feed hydrocarbon boiling in the gasoline boiling range and from about 100° to about 450° F. The feed hydrocarbon may suitably be a purified hydrocarbon such as an aromatic hydrocarbon or saturated hydrocarbon. Particularly, the feed hydrocarbon may be an aliphatic or an aromatic solvent. Suitably fractions which may be employed in the practice of the present invention may be obtained from distillation of crude petroleum or may be obtained from certain reforming operations, such as platinum hydroforming of selected naphthenic fractions followed by treatment of the hydroformed product to obtain a fraction of the desired boiling range and characteristics.

The bed of inert particulate bodies will suitably be a bed of quartz, granite, gravel, and rock having a mesh size in the range from about 10 to about 50 mesh. A preferred body is finely divided quartz of the size set out hereinbefore.

In order to obtain desirable results, a suitable flow rate in the range from about 500 to about 7500 barrels of feed hydrocarbon per ton of bed per day may be used.

In conducting operations with an aromatic hydrocarbon fraction containing hydrogen sulfide and water in the range given, desirable results have been obtained in that the hydrogen sulfide content has been reduced to no more than about 0.1 part per million while the water content of the effluent from the bed has not been increased.

It is important to remove hydrogen sulfide from hydrocarbon solvents and the like since specifications for materials of this nature, such as ASTM D853–47, requires that these materials show a negative test for hydrogen sulfide. The test is sensitive to about 0.1 part per million of hydrogen sulfide. The present invention allows the meeting of this test.

Furthermore, in processing operations, it is important that the water content of the contacted material not be increased since in processing aromatic and saturated hydrocarbon solvents, for example, benzene, toluene, xylenes, cyclohexane and homologs thereof, it is desirable in some instances to subject the so-treated material to fractional crystallization processes at relatively low temperatures. If the water content of the treated material is appreciated, then difficulties may be encountered in that chilling equipment may become fouled, with deposition of ice which may make the crystallization process inoperable. The present invention eliminates the problem and does not increase the water content of the hydrogen sulfide-free materials and further meets the specification of hydrogen sulfide.

The invention will be further illustrated by reference to the drawing in which the sole figure is a diagrammatic flow sheet of a preferred mode.

Referring now to the drawing, numeral 11 designates a feed line controlled by a valve 12 which connects a source of feed hydrocarbon, not shown, with a treating zone 13 containing a bed 14 of inert particulate bodies, such as that of quartz, which suitably may be arranged on a grid plate 15. The treated hydrocarbon discharges from the treating zone 13 by way of line 16 and then may suitably be processed or used as desired.

The bed 14 contains particles of quartz; for example, prior to the charging of the hydrocarbon the treating zone 13 is filled with 50° Bé. sodium hydroxide solution which is introduced into line 11 by way of line 17 controlled by valve 18. The sodium hydroxide is allowed to flush through the bed 14 and overflow by way of line 19 controlled by valve 20. Thereafter the excess sodium hydroxide in the zone 13 is removed therefrom by line 11 or by way of line 11 and line 17 with the flow being reversed as shown by the arrows. This leaves a thin film of sodium hydroxide on the quartz which has a thickness in the range from about 0.00005 to about 0.0005 inch. A suitable film thickness is about 0.0002 inch. About two gallons of sodium hydroxide are used per ton of quartz. Thereafter the hydrocarbon flow is initiated through the bed 14 by manipulating valve 12 in line 11 and allowing the treated hydrocarbons to discharge by line 16. After a prolonged period of operating time, say for about 30 days wherein about 190,000 barrels of hydrocarbon have been treated in a typical commercial installation, it may be desirable to renew the bed 14 by removing the film of sodium hydroxide therefrom and replacing it with a fresh film of sodium hydroxide. This may suitably be accomplished by closing valve 12 and introducing water into line 11 by way of line 21 controlled by valve 22 and allowing the water to flush through the bed 14 and overflow by way of line 19 controlled by valve 20. Thereafter when the film of depleted caustic has been removed from the quartz bodies, the water is allowed to drain from the bed by way of line 11 or by way of lines 11 and 21, the flow being in the opposite direction indicated by the arrows. Fresh caustic would then be introduced by way of line 17 controlled by valve 18 and allowed to overflow by line 19 by opening valve 20. Excess caustic would be drained from the treating zone 13 and thereafter the flow of hydrocarbon would be resumed.

By way of explanation of the beneficial results obtainable with the present invention, the film of sodium hydroxide on the quartz is at least in part dispersed within the quartz bodies and the water content of the film is substantially maintained in equilibrium content by contact with the hydrocarbon.

This may be illustrated by the data presented in Table I wherein the water content of aromatic solvents for several days' operation are presented comparing the water content of the feed or charge with the water content of the product.

TABLE I

*Water content of aromatic solvents weight percent*

|  | Feed or Charge | Product |
|---|---|---|
| 1st Day | | .004 |
| 2nd Day | .004 | .0036 |
| 3rd Day | | .0054 |
| 4th Day | .0036 | .0036 |

An examination of the data in Table I shows that the amount of water in the product has not been increased by passage through the quartz bed containing a film of caustic.

In comparison to such an operation when a 50° Bé. caustic solution was used to contact the feed hydrocarbon, the water content of the product from this caustic treating operation increased substantially and resulted in fouling of low temperature exchangers in a crystallization process.

A bed of 20 to 28 mesh quartz was wetted with 50° Bé. sodium hydroxide solution. The bed had a length to diameter ratio of 3:1. Xylene and toluene containing from about 0.2 to about 0.5 part per million of hydrogen sulfide were passed upflow at rates as high as 1600 barrels per day. A total of approximately 16,000 barrels of these aromatics were treated to 0 or less than 0.1 part per million of hydrogen sulfide.

After the conclusion of these operations, the bed was examined and it was found that the quartz contained 3.24% by weight of sodium hydroxide, 0.677% by weight of sodium sulfide and a total sulfur of 0.014% by weight. The sodium sulfide and caustic were flushed from the quartz with water and the quartz was then rewetted with sodium hydroxide for further use.

In a larger installation, a bed of quartz having a film of 50° Bé. caustic has been provided and has been used in treating approximately 9,500 barrels per day of hydrocarbon solvents. The amount of hydrogen sulfide remaining in the treated product was well within the specification given supra. An excess of 140,000 barrels of hydrocarbons has been treated with an initial charge of sodium hydroxide.

From the foregoing description taken with the drawing and the several examples, it will be clear that an improved and advantageous process has been provided for removing hydrogen sulfide from hydrocarbon solvents and for providing a treated product containing only a small amount of water.

The nature and objects of the present invention having been completely described and illustrated, what we wish to claim as new and useful and to secure by Letters Patent is:

1. A method for treating hydrocarbons which comprises contacting a feed hydrocarbon containing from about 0.2 to about 5.0 parts per million of hydrogen sulfide and containing from about 20 to about 100 parts per million of water with a bed of inert particulate quartz bodies having a film of a 50° Bé. solution of NaOH dispersed thereon and obtaining from said bed a contacted hydrocarbon containing no more than about 0.1 part per million of hydrogen sulfide and no more than the amount of water in said feed hydrocarbon, said film having a thickness within the range of about 0.00005 to about 0.0005 inch.

2. A method in accordance with claim 1 in which the feed hydrocarbon boils within the range from about 100° to about 450° F.

3. A method in accordance with claim 1 in which the feed hydrocarbon is an aromatic hydrocarbon.

4. A method in accordance with claim 1 in which the feed hydrocarbon is a saturated hydrocarbon.

5. A method in accordance with claim 1 in which the feed hydrocarbon contacts the bed at a flow rate within the range from about 500 to about 7500 barrels per ton of bed per day.

6. A method for treating a hydrocarbon feed stock boiling within the range of about 100° to about 450° F. and containing from about 0.2 to about 5.0 parts per million of hydrogen sulfide and from about 20 to about 100 parts per million of water which comprises bringing said feed stock into contact with a bed of finely divided quartz particles, said quartz particles having a film of about 50 Bé. sodium hydroxide dispersed thereon and obtaining from said bed a contacted hydrocarbon containing no more than about 0.1 parts per million of hydrogen sulfide and no more than the amount of water in said feed hydrocarbon, said film having a thickness of about 0.0002 inch.

7. A method which comprises treating a bed of quartz particles having a mesh size within the range of about 10 to 50 mesh with about 2 gallons of about 50 Bé. sodium hydroxide per ton of quartz to provide a film of about 50 Bé. sodium hydroxide on the surface of said quartz particles, said film having a thickness of about 0.0002 inch, and then flowing an aromatic hydrocarbon feed stock boiling within the range of about 100° to 450° F. through said thus-treated bed, said feed stock containing from about 0.2 to about 5.0 parts per million of hydrogen sulfide and from about 20 to 100 parts per million of water and removing from said bed a contacted aromatic hydrocarbon containing no more than about 0.1 part per million of hydrogen sulfide and no more than the amount of water in said aromatic feed stock.

References Cited in the file of this patent

UNITED STATES PATENTS

| | | |
|---|---|---|
| 1,802,628 | Caldwell | Apr. 28, 1931 |
| 1,833,396 | Gary | Nov. 24, 1931 |
| 2,577,824 | Stine | Dec. 11, 1951 |
| 2,690,989 | Bottenberg | Oct. 5, 1954 |
| 2,748,059 | Nixon et al. | May 19, 1956 |